Oct. 20, 1925. 1,558,083

G. GITTENS

EDUCATIONAL GAME

Filed July 22, 1921

INVENTOR.
Grace Gittens
BY
Abel L. Brownrigg ATTORNEY.

Patented Oct. 20, 1925.

1,558,083

UNITED STATES PATENT OFFICE.

GRACE GITTENS, OF EAST ORANGE, NEW JERSEY.

EDUCATIONAL GAME.

Application filed July 22, 1921. Serial No. 486,734.

*To all whom it may concern:*

Be it known that I, GRACE GITTENS, a citizen of the United States, and resident of East Orange, in the county of Essex and State of New Jersey, have invented certain new and useful Improvements in Educational Games, of which the following is a specification.

This invention relates generally to educational appliances and more particularly to a game adapted to be used in instructing children in the rudiments of music.

The principal purpose and object of the invention is to provide a game of a character which will be attractive and interesting to children, and which will at the same time be of great assistance to a teacher in imparting instruction in music to pupils in the beginning classes.

The invention consists generally in the provision of a plurality of instruction sheets or cards, preferably of the rotatable disk type, and which are provided with musical indicia or characters adapted to be interpreted in corresponding but different terms by means of appropriately inscribed cards, or on a representation of a piano keyboard with which each pupil may be provided.

In the drawing in which several of the many possible embodiments of the invention have been illustrated.

Figure 1:
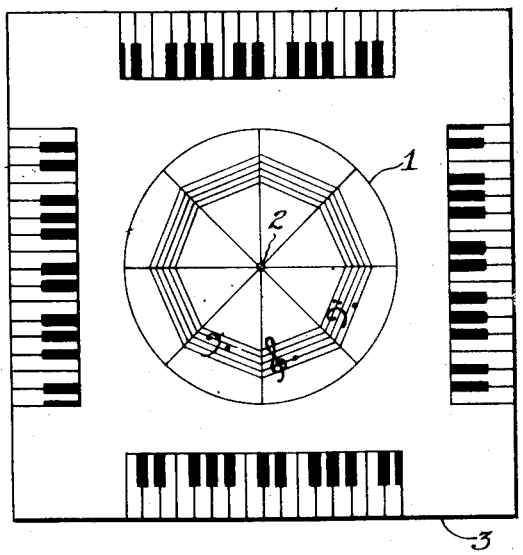
Figure 1 is a partly plan and partly diagrammatic view of a rotatable card forming part of the invention, the card being mounted on a table top together with four representations of a part of a piano keyboard.

Referring to the drawing there is shown in Figure 1 a round card or disk 1 mounted to rotate about a peg or pin 2 at its center. A table top or other suitable surface 3 is adapted to form a support for the rotatable card 1 and about the sides of which the children playing the game may be seated.

In the form of the invention shown in Figure 1 the rotatable disk 1 is divided into eight sectors 5, each of which has represented thereon a portion of a musical staff together with either the bars or the treble clef designation and a dot showing the position of a note. Any sector of the disk with its musical indicia can be turned to face any one of the four sides or edges of the square table top 3 shown as will be clear.

Figure 2:
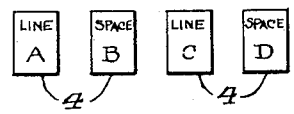
Figure 2 shows a partial set of cards suitably inscribed to interpret the indicia shown on the rotatable card in Figure 1.

Formed to be used in conjunction with the rotatable disk 1 is a set of cards 4 illustrated in part in Figure 2 of the drawing. The cards 4 bear the designations "Line A", "Space B", and so on, to the end of the series, so that a card is present in each set for each line and space of the staff. Preferably one or more such sets of cards accompany each game so that each child seated at the table 1 may be supplied with a partial or a complete set of cards in accordance with the particular variation of the game played.

Another feature of the invention resides in the use of a representation on cardboard or the like of a portion of a piano keyboard 6, sections showing two complete octaves being shown in Figure 1. The blank keyboard 6 may be one-half or full size, as preferred, and may for convenience be formed to fold across the middle.

In playing the game the teacher or instructor rotates the disk 1 so as to change the position of the indicia bearing sectors 5 and place a new sector before each pupil. The pupil thereupon examines the indicia displayed upon the confronting sector and determines, for instance, what letter is called for by the dot or mark on the staff. The child then consults the cards in her hand and if she finds the letter corresponding to the line or space designated on the staff she plays the card by placing it on the sector 5 of the disk before her. Should the pupil be unable to find the proper card by reason, for instance, of having previously played it, the turn is lost and the disk is again rotated by the teacher for the benefit of the next player. The player whose cards are first exhausted wins the game.

In addition to the use of the game cards 4 referred to the pupils can vary or add to the play by picking out on the keyboard 6 the letter or note designated on the adjacent staff section. Each step in the game or lesson would, of course, be verified by the teacher before turning the disk 1 for the next step.

Figure 3:
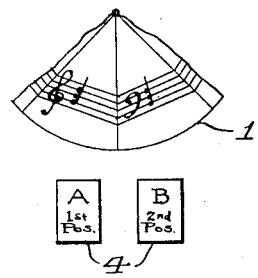
Figure 3 is a view of a portion of a rotatable card and a partial set of individual game cards showing musical indicia differing from that shown in Figures 1 and 2.

Many variations of the game may be resorted to by a clever instructor, as will be clear, so as to obviate the tiring of young pupils and prevent their losing interest. Not only can variations be worked out in the play or work with a particular disk 1 and set of cards 4, but many useful and instructive variations in the indicia borne by the disks and cards can also be employed. A teacher may supply herself with a considerable number of rotatable disks all differing among themselves and having appropriate sets of game cards 4. For instance, in Figure 3 a portion of a rotatable disk is shown in which the two staff sections show groupings of notes to form chords. Game cards 4 for this particular disk may be designated "A 1st Pos," "B 2nd Pos," etc., for the various chords and positions, as well as to designate the major and minor chords and classes thereunder as may be found desirable.

Figure 4:
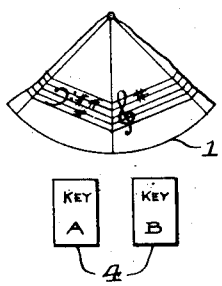
Figure 4 is a view similar to Figure 3 and showing still another form of indicia.
Figure 5:
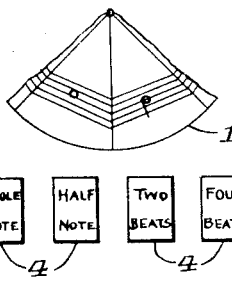
Figure 5 is a view similar to Figure 3 showing still another form of indicia.

Other desirable forms are shown in Figures 4 and 5 in which are respectively shown the various staff signatures corresponding to cards designated "Key A," "Key B," and the like, and the various kinds of notes with appropriate cards marked "Whole note," "Half note," and so on through the series.

Figure 6:
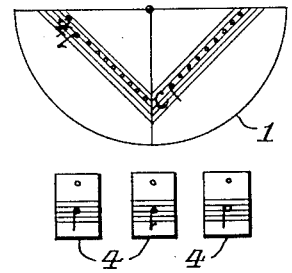
Figure 6 is a view similar to Figure 3 showing the use of pegs on the rotatable card to which the game cards can be fitted.

In Figure 6 is shown a modification in which the disk 1 is divided into four instead of eight sectors, the staff section in each sector being provided with a row of pegs 9 throughout its length. The cards 4 which are used with this form of disk are provided with a metal edged opening 10 adapted to be placed over the pegs 9. With this form of card a certain tempo is indicated for each staff and the pupil is expected to fill out the measure with notes of different values, which are designated on the accompanying cards. It is to be understood that the use of pegs is not limited to the particular form of disk shown in Figure 6 but they are capable of use with the other forms also.

Figure 7:
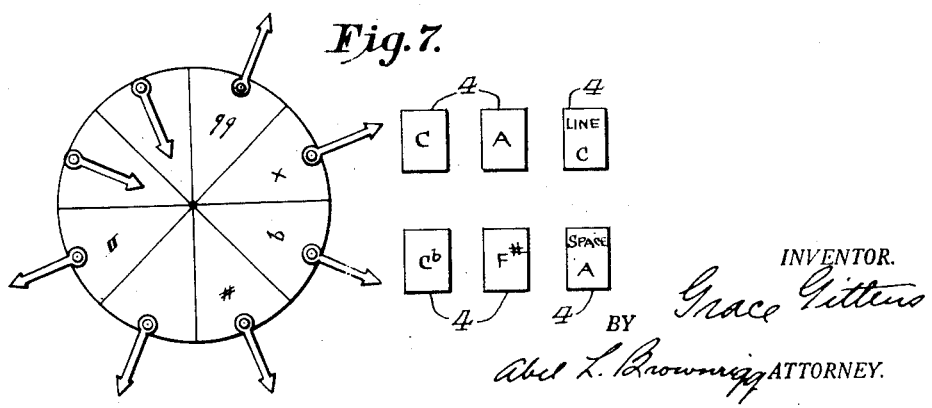
Figure 7 is a view showing a modified form of rotatable card and appropriate game cards, the rotatable card being provided with arrows or pointers.

In Figure 7 of the drawing a modified form of disk is shown which is provided at its periphery with indicating pointers or arrows 12. These arrows assist in designating to the pupil which sector is to be treated. The arrows can be removed and caused to point inwardly for packing or other purposes. The disk sectors in Figure 7 show various staff signatures and cards for use therewith may be marked "C," "A," "C flat," "F sharp," "Line C," "Space A," and the like. Many other variations and extensions of this modification and the remaining modifications are comprehended in the invention.

What I claim is:

1. An educational game comprising a representation of a keyboard: a member bearing a plurality of musical notations, said member being movable to bring any of said notations into position for observance and in adjacency to said keyboard, and a set of cards bearing designations different from but related to the notations on said member.

2. An educational game comprising: a rotatable member bearing a plurality of designations of elements pertaining to music, a supporting surface for the rotatable member having a keyboard represented thereon, and a set of cards bearing designations different from but related to the designations on said rotatable member said rotatable member being adapted to be manipulated to bring different designations thereon into cooperative relation to the keyboard.

3. An educational game comprising: a rotatable disk bearing a plurality of groups of indicia pertaining to music, a set of cards bearing designations interpretive of said indicia and adapted to be selected to match corresponding indicia brought into position for observance by the rotation of the disk and a polygonal supporting surface for the disk having keyboards represented along the edges thereof.

4. An educational game comprising: a rotatable member provided with indicia representing musical characters, a supporting surface for the rotatable member having a simulation of a keyboard on which said musical characters may be represented, and a set of cards bearing designations interpretive of said characters, the rotation of said member serving to bring different indicia thereon into cooperative relation to said keyboard.

GRACE GITTENS.